(12) United States Patent
Fattal et al.

(10) Patent No.: US 11,204,457 B2
(45) Date of Patent: Dec. 21, 2021

(54) MICROSTRUCTURED MULTIBEAM ELEMENT BACKLIGHTING

(71) Applicant: LEIA INC., Menlo Park, CA (US)

(72) Inventors: David A. Fattal, Mountain View, CA (US); Ming Ma, Palo Alto, CA (US); Xuejian Li, Menlo Park, CA (US)

(*) Notice: Subject to any disclaimer, the term of this patent is extended or adjusted under 35 U.S.C. 154(b) by 0 days.

(21) Appl. No.: 16/658,079

(22) Filed: Oct. 19, 2019

(65) Prior Publication Data

US 2020/0049878 A1    Feb. 13, 2020

Related U.S. Application Data

(63) Continuation of application No. PCT/US2017/032299, filed on May 11, 2017.

(51) Int. Cl.
*F21V 8/00* (2006.01)
*G02B 30/26* (2020.01)

(52) U.S. Cl.
CPC ......... *G02B 6/0036* (2013.01); *G02B 6/0055* (2013.01); *G02B 6/0061* (2013.01); *G02B 30/26* (2020.01)

(58) Field of Classification Search
CPC .... G02B 6/0036; G02B 30/26; G02B 6/0055; G02B 6/0061; G02B 5/02; G02B 30/27; G02F 1/1336
See application file for complete search history.

(56) References Cited

U.S. PATENT DOCUMENTS 6,667,819 B2    12/2003  Nishikawa et al.
8,384,861 B2    2/2013   Jepsen
(Continued)

FOREIGN PATENT DOCUMENTS

CN    105223641 A    1/2016
JP    2004152496 A   5/2004
(Continued)

OTHER PUBLICATIONS

International Search Report and Written Opinion (ISRWO) by International Searching Authority (ISA) Korean ntellectual Property Office (KIPO) dated Jan. 30, 2018 (13 pages) for counterpart parent PCT Application No. PCT/US2017/032299.
Fattal, David et al., "A multi-directional backlight for a wide-angle, glasses-free three-dimensional display," Nature, Mar. 21, 2013, pp. 348-351, vol. 495, Macmillan Publishers Limited, 2013.
Reichelt, et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.
(Continued)

*Primary Examiner* — Kevin Quarterman
(74) *Attorney, Agent, or Firm* — J. Michael Johnson

(57) ABSTRACT

A multiview backlight and a multiview display employ a microstructured multibeam element to emit a plurality of directional light beams having principal angular directions corresponding to view directions of the multiview display. The multiview backlight includes a light guide and the microstructured multibeam element adjacent and external to a surface of the light guide. The microstructured multibeam element has an input aperture configured to receive a portion of guided light from the light guide and an output aperture configured to emit the plurality of directional light beams. The microstructured multibeam element comprises a microstructure having an interior surface configured to reflect the received guided light portion to provide the plurality of directional light beams at the output aperture. The multiview display includes the multiview backlight and an array of multiview pixels configured to provide different views of the multiview display.

19 Claims, 10 Drawing Sheets

(56) References Cited

U.S. PATENT DOCUMENTS

| | | |
|---|---|---|
| 9,128,226 B2 | 9/2015 | Fattal et al. |
| 9,201,270 B2 | 12/2015 | Fattal et al. |
| 9,298,168 B2 | 3/2016 | Taff et al. |
| 9,372,349 B2 | 6/2016 | Brug et al. |
| 9,389,415 B2 | 7/2016 | Fattal et al. |
| 9,459,461 B2 | 10/2016 | Santori et al. |
| 9,557,466 B2 | 1/2017 | Fattal |
| 9,785,119 B2 | 10/2017 | Taff et al. |
| 2006/0077688 A1 | 4/2006 | Uehara et al. |
| 2006/0262376 A1 | 11/2006 | Mather et al. |
| 2011/0242441 A1 | 10/2011 | Minami |
| 2012/0008067 A1 | 1/2012 | Mun et al. |
| 2012/0147059 A1* | 6/2012 | Chen ............... G02B 30/27 345/690 |
| 2012/0195072 A1 | 8/2012 | Minami |
| 2012/0200807 A1 | 8/2012 | Wei et al. |
| 2012/0262940 A1 | 10/2012 | Miyairi et al. |
| 2013/0169694 A1* | 7/2013 | Chen ............... G02B 6/0035 345/690 |
| 2013/0329301 A1 | 12/2013 | Travis |
| 2015/0192727 A1* | 7/2015 | Kuo ............... G02B 6/0061 349/65 |
| 2015/0355403 A1 | 12/2015 | Santori et al. |
| 2016/0033705 A1 | 2/2016 | Fattal |
| 2016/0299279 A1 | 10/2016 | Uehara et al. |
| 2016/0320620 A1 | 11/2016 | Maimone |
| 2017/0363794 A1 | 12/2017 | Wan et al. |
| 2018/0011237 A1 | 1/2018 | Fattal |
| 2018/0156963 A1 | 6/2018 | Fattal |
| 2018/0172893 A1 | 6/2018 | Fattal et al. |
| 2018/0188441 A1 | 7/2018 | Fattal |
| 2018/0188691 A1 | 7/2018 | Fattal |
| 2018/0196194 A1* | 7/2018 | Fattal ............... G02F 1/1335 |
| 2018/0278923 A1 | 9/2018 | Fattal |
| 2018/0299608 A1 | 10/2018 | Fattal et al. |
| 2018/0306965 A1 | 10/2018 | Fattal |
| 2019/0025494 A1 | 1/2019 | Fattal et al. |
| 2019/0155105 A1 | 5/2019 | Aieta et al. |
| 2019/0302336 A1 | 10/2019 | Fattal et al. |

FOREIGN PATENT DOCUMENTS

| | | |
|---|---|---|
| JP | 2008233674 A | 10/2008 |
| WO | 2012038856 A1 | 3/2012 |
| WO | 2012077360 A1 | 6/2012 |
| WO | 2017039750 A1 | 3/2017 |

OTHER PUBLICATIONS

Travis, et al., "Collimated light from a waveguide for a display backlight," Optics Express, Oct. 2009, pp. 19714-19719, vol. 17, No. 22.

Xu, et al., "Computer-Generated Holography for Dynamic Display of 3D Objects with Full Parallax," International Journal of Virtual Reality, 2009, pp. 33-38, vol. 8, No. 2.

Son, Jung-Young, et al., "Three-Dimensional Imaging Methods Based on Multiview Images," IEEE/OSA Journal of Display Technology, Sep. 2005, pp. 125-140, vol. 1, No. 1.

Kee, Edwin, "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Maimone, A., et al., Pinlight Displays: Wide Field of View Augmented Reality Eyeglasses using Defocused Point Light Sources, ACM Transactions on Graphics, Jul. 2014, pp. 89.1-89.11, vol. 33, No. 4, Article 89.

Liu, Chun-Wei, et al., Sub-wavelength gratings fabricated on a light bar by roll-to-roll UV embossing process, Optics Express, Jun. 6, 2011, pp. 11299-11311, vol. 19, No. 12.

\* cited by examiner

MICROSTRUCTURED MULTIBEAM ELEMENT BACKLIGHTING

CROSS-REFERENCE TO RELATED APPLICATIONS

This application is a continuation patent application of and claims the benefit of priority to International Application No. PCT/US2017/032299, filed May 11, 2017, the entirety of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example. Alternatively, the various colors may be implemented by field-sequential illumination of a display using different colors, such as primary colors.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a microstructured multibeam element and a multiview backlight using the microstructured multibeam element, the multiview backlight having application to a multiview or three-dimensional (3D) display. In particular, embodiments consistent with the principles described herein provide a multiview backlight employing microstructured multibeam elements configured to provide a plurality of directional light beams having different principal angular directions from one another. The plurality of directional light beams may have directions corresponding to view directions of a multiview display, for example. Further, the microstructured multibeam elements each comprise one or more microstructures and provide the directional light beam plurality by receiving light coupled out of a light guide of the multiview backlight and reflecting the received, coupled-out light at an interior surface or wall of the microstructure of the microstructured multibeam element, according to various embodiments. Uses of multiview displays employing the multiview backlight described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices. Moreover, employing microstructured multibeam elements may provide exceptional angular color uniformity, especially when a white light source is used to illuminate the multiview backlight.

Figure 1A:
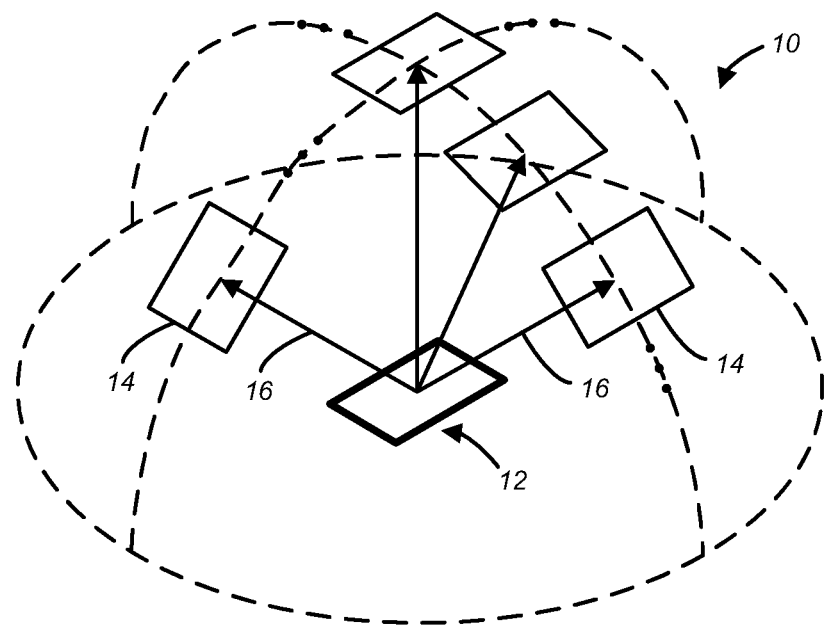
FIG. 1A illustrates a perspective view of a multiview display in an example, according to an embodiment consistent with the principles described herein.

Herein, a 'multiview display' is defined as an electronic display or display system configured to provide different views of a multiview image in different view directions. FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The screen 12 may be a display screen of a telephone (e.g., mobile telephone, smart phone, etc.), a tablet computer, a laptop computer, a computer monitor of a desktop computer, a camera display, or an electronic display of substantially any other device, for example. The multiview display 10 provides different views 14 of the multiview image in different view directions 16 relative to the screen 12. The view directions 16 are illustrated as arrows extending from the screen 12 in various different principal angular directions with the different views 14 being illustrated as polygonal boxes at the termination of the arrows (i.e., depicting the view directions 16). Only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 1B:
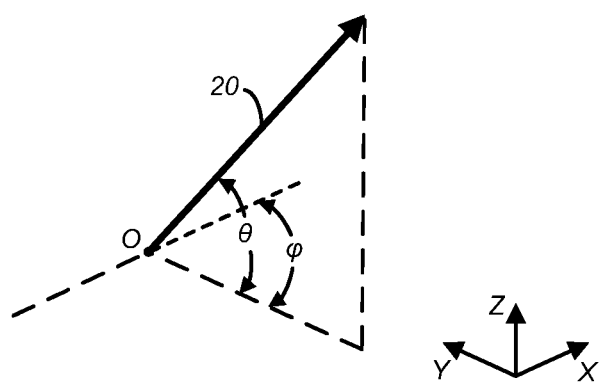
FIG. 1B illustrates a graphical representation of angular components of a light beam having a particular principal angular direction corresponding to a view direction of a multiview display in an example, according to an embodiment consistent with the principles described herein.

FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of sub-pixels representing 'view' pixels in each of a similar plurality of different views of a multiview display. In particular, a multiview pixel may have an individual sub-pixel corresponding to or representing a view pixel in each of the different views of the multiview image. Moreover, the sub-pixels of the multiview pixel are so-called 'directional pixels' in that each of the sub-pixels is associated with a predetermined view direction of a corresponding one of the different views, by definition herein. Further, according to various examples and embodiments, the different view pixels represented by the sub-pixels of a multiview pixel may have equivalent or at least substantially similar locations or coordinates in each of the different views. For example, a first multiview pixel may have individual sub-pixels corresponding to view pixels located at $\{x_1, y_1\}$ in each of the different views of a multiview image, while a second multiview pixel may have individual sub-pixels corresponding to view pixels located at $\{x_2, y_2\}$ in each of the different views, and so on.

In some embodiments, a number of sub-pixels in a multiview pixel may be equal to a number of views of the multiview display. For example, the multiview pixel may provide sixty-four (64) sub-pixels in associated with a multiview display having 64 different views. In another example, the multiview display may provide an eight by four array of views (i.e., 32 views) and the multiview pixel may include thirty-two 32 sub-pixels (i.e., one for each view). Additionally, each different sub-pixel may have an associated direction (e.g., light beam principal angular direction) that corresponds to a different one of the view directions corresponding to the 64 different views, for example. Further, according to some embodiments, a number of multiview pixels of the multiview display may be substantially equal to a number of 'view' pixels (i.e., pixels that make up a selected view) in the multiview display views. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

By definition herein, a 'multibeam element' is a structure or element of a backlight or a display configured to light that includes a plurality of directional light beams. A 'microstructured multibeam element' is defined herein as a multibeam element comprising one or more microstructures, the one or more microstructures having an interior surface configured to reflect light. In particular, the microstructured multibeam element is configured to receive light at or through an input aperture and to provide the plurality of directional light beams comprising the light reflected by the microstructure(s) of the microstructured multibeam element, by definition herein. In various embodiments, reflection of light may be provided by total internal reflection at the interior surface of the microstructure. In some embodiments, a reflective layer or material on an exterior surface of the microstructure may be configured to provide or enhance reflection at the interior surface thereof.

In various embodiments, the microstructured multibeam element is optically coupled or optically connected, either directly or indirectly (e.g., by evanescent coupling) to a light guide of a backlight. Further, the microstructured multibeam element is configured to receive light by coupling out a portion of light guided by the light guide. The light beams of the plurality of light beams produced by a microstructured multibeam element through reflection of the received guided light portion within the microstructure have different principal angular directions from one another, by definition herein. As such, the light beams are referred to as 'directional' light beams herein. In particular, by definition, a directional light beam of the plurality of directional light beams has a predetermined principal angular direction that is different from a direction of other directional light beams of the directional light beam plurality.

According to some embodiments, the directional light beam plurality may represent a light field. For example, the directional light beam plurality may be confined to a substantially conical region of space or have a predetermined angular spread that includes the principal angular direction of the light beams in the light beam plurality. As such, the predetermined angular spread of the directional light beams in combination (i.e., the directional light beam plurality) may represent the light field.

According to various embodiments, the principal angular direction of the various directional light beams is determined by a characteristic including, but not limited to, a size (e.g., length, width, area, etc.) of the microstructured multibeam element (such as a size of an output aperture the microstructured multibeam element or an aggregate size of a plurality of microstructures that make up the microstructured multibeam element). In some embodiments, the microstructured multibeam element may be considered an 'extended point light source', i.e., a plurality of point light sources distributed across an extent of the microstructured multibeam element, by definition herein. Further, a directional light beam produced by the microstructured multibeam element has a principal angular direction given by angular components $\{\theta, \tau\}$, by definition herein, and as described above with respect to FIG. 1B.

Herein a 'collimator' is defined as substantially any optical device or apparatus that is configured to collimate light. For example, a collimator may include, but is not limited to, a collimating mirror or reflector, a collimating lens, a collimating diffraction grating, and various combinations thereof. In some embodiments, the collimator comprising a collimating reflector may have a reflecting surface characterized by a parabolic curve or shape. In another example, the collimating reflector may comprise a shaped parabolic reflector. By 'shaped parabolic' it is meant that a curved reflecting surface of the shaped parabolic reflector deviates from a 'true' parabolic curve in a manner determined to achieve a predetermined reflection characteristic (e.g., a degree of collimation). Similarly, a collimating lens may comprise a spherically shaped surface (e.g., a biconvex spherical lens). In some embodiments, the collimator may be a continuous reflector or a continuous lens (i.e., a reflector or lens having a substantially smooth, continuous surface). In other embodiments, the collimating reflector or the collimating lens may comprise a substantially discontinuous surface such as, but not limited to, a Fresnel reflector or a Fresnel lens that provides light collimation.

According to various embodiments, the collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., $+/-\sigma$ a degrees about a central or principal angular direction of the collimated light beam). The light rays of the collimated light beam may have a Gaussian distribution in terms of angle and the angular spread be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., the light source may be configured to produce white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further, as used herein, the article 'a' is intended to have its ordinary meaning in the patent arts, namely 'one or more'. For example, 'a microstructured multibeam element' means one or more microstructured multibeam elements and as such, 'the microstructured multibeam element' means 'the microstructured multibeam element(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2A:
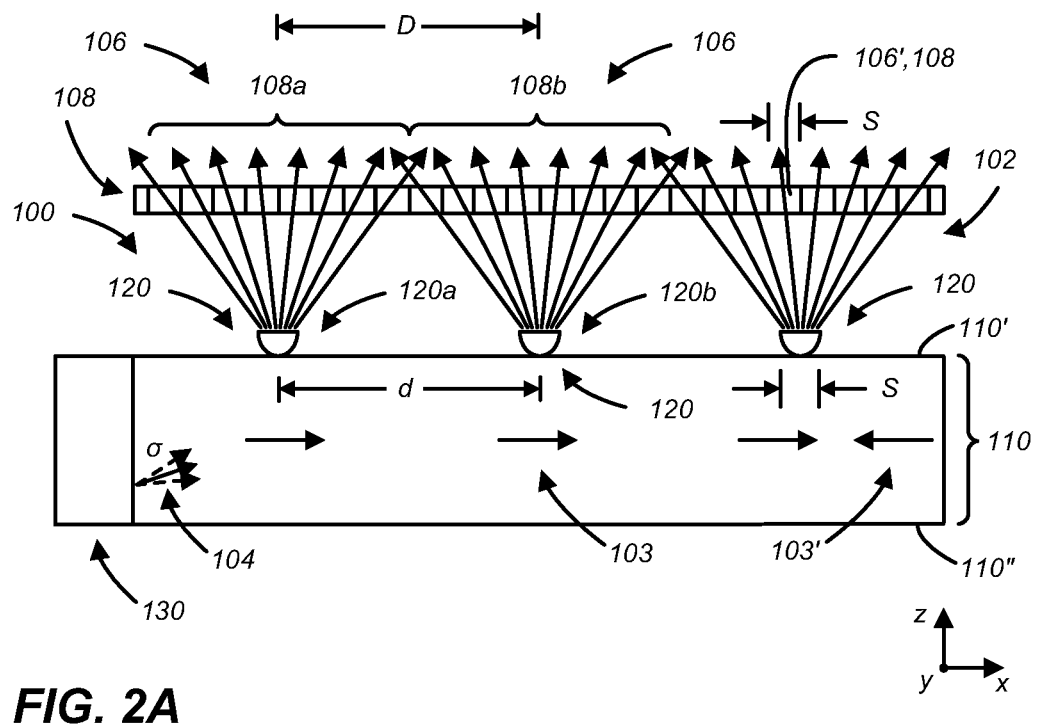
FIG. 2A illustrates a cross sectional view of a multiview backlight in an example, according to an embodiment consistent with the principles described herein.
Figure 2B:
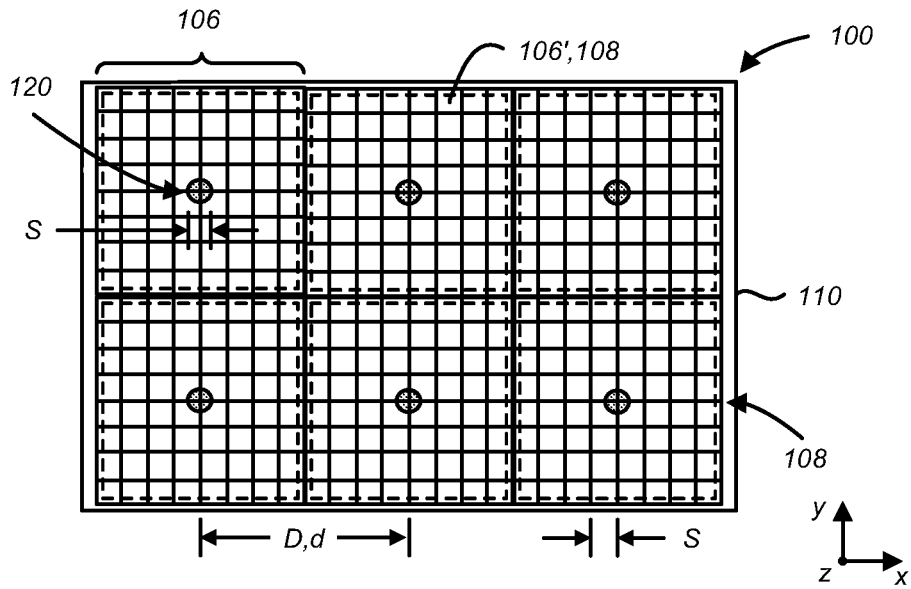
FIG. 2B illustrates a plan view of a multiview backlight in an example, according to an embodiment consistent with the principles described herein.
Figure 2C:
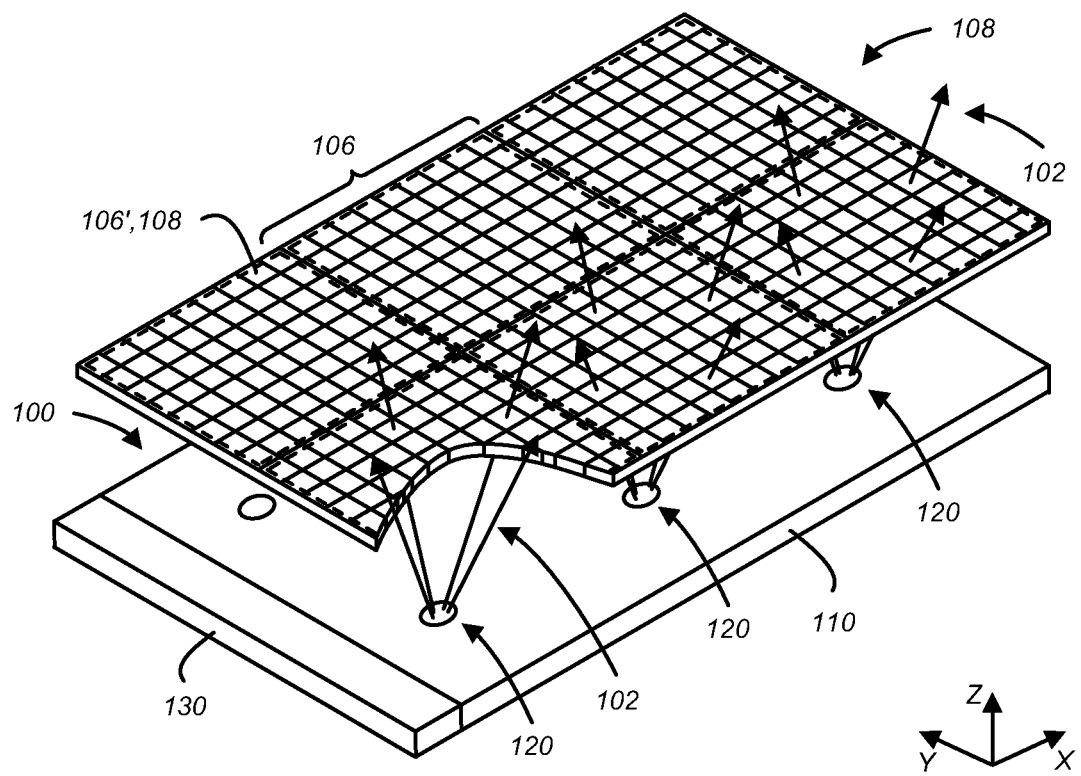
FIG. 2C illustrates a perspective view of a multiview backlight of in an example, according to an embodiment consistent with the principles described herein.

According to some embodiments of the principles described herein, a multiview backlight is provided. FIG. 2A illustrates a cross sectional view of a multiview backlight 100 in an example, according to an embodiment consistent with the principles described herein. FIG. 2B illustrates a plan view of a multiview backlight 100 in an example, according to an embodiment consistent with the principles described herein. FIG. 2C illustrates a perspective view of a multiview backlight 100 in an example, according to an embodiment consistent with the principles described herein. The perspective view in FIG. 2C is illustrated with a partial cut-away to facilitate discussion herein only.

The multiview backlight 100 illustrated in FIGS. 2A-2C is configured to provide a plurality of directional light beams 102 having different principal angular directions from one another (e.g., as a light field). In particular, the provided plurality of directional light beams 102 are directed away from the multiview backlight 100 in different principal angular directions corresponding to respective view directions of a multiview display, according to various embodiments. In some embodiments, the directional light beams 102 may be modulated (e.g., using light valves, as described below) to facilitate the display of information having multiview or 3D content (e.g., as a multiview or 3D image).

As illustrated in FIGS. 2A-2C, the multiview backlight 100 comprises a light guide 110. The light guide 110 may be a plate light guide 110, according to some embodiments. The light guide 110 is configured to guide light along a length of the light guide 110 as guided light 104. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In some embodiments, the light guide 110 may be a slab or plate optical waveguide comprising an extended, substantially planar sheet of optically transparent, dielectric material. The substantially planar sheet of dielectric material is configured to guide the guided light 104 (e.g., as a guided light beam) using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

Further, according to some embodiments, the light guide 110 is configured to guide the guided light 104 according to total internal reflection at a non-zero propagation angle between a first surface 110' (e.g., a 'top' or 'front' surface or side) and a second surface 110" (e.g., a 'bottom' or 'back' surface or side) of the light guide 110. In particular, the guided light 104 may propagate by reflecting or 'bouncing' between the first surface 110' and the second surface 110" of the light guide 110 at the non-zero propagation angle.

In some embodiments, the light guide 110 may be configured to 'recycle' the guided light 104. In particular, the guided light 104 that has been guided along the light guide length may be redirected back along that length in another propagation direction 103' that differs from the propagation direction 103. For example, the light guide 110 may include a reflector (not illustrated) at an end of the light guide 110 opposite to an input end adjacent to the light source. The reflector may be configured to reflect the guided light 104 back toward the input end as recycled guided light. Recycling guided light 104 in this manner may increase a brightness of the multiview backlight 100 (e.g., an intensity of the directional light beams 102) by making guided light 104 available more than once for out-coupling, e.g., by microstructured multibeam elements, described below. Alternatively (e.g., as opposed to recycling guided light), guided light 104 propagating in the other propagation direction 103' may be provided by introducing light into the light guide 110 with the other propagation direction 103' (e.g., in addition to guided light 104 having the propagation direction 103). In FIG. 2A, a bold arrow indicating a propagation direction 103' of recycled guided light (e.g., directed in a negative x-direction) illustrates a general propagation direction of the recycled guided light within the light guide 110.

As illustrated in FIGS. 2A-2C, the multiview backlight 100 further comprises a plurality of microstructured multibeam elements 120 spaced apart from one another along the light guide length. In particular, the microstructured multibeam elements 120 of the plurality are separated from one another by a finite space and represent individual, distinct elements along the light guide length. That is, by definition herein, the microstructured multibeam elements 120 of the plurality are spaced apart from one another according to a finite (i.e., non-zero) inter-element distance (e.g., a finite center-to-center distance). Further the microstructured multibeam elements 120 of the plurality generally do not intersect, overlap or otherwise touch one another, according to some embodiments. As such, each microstructured multibeam element 120 of the plurality is generally distinct and separated from other ones of the microstructured multibeam elements 120 of the microstructured multibeam element plurality.

According to some embodiments, the microstructured multibeam elements 120 of the plurality may be arranged in either a one-dimensional (1D) array or two-dimensional (2D) array. For example, the plurality of microstructured multibeam elements 120 may be arranged as a linear 1D array. In another example, the plurality of microstructured multibeam elements 120 may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the microstructured multibeam elements 120 may be substantially uniform or constant across the array. In other examples, the inter-element distance between the microstructured multibeam elements 120 may be varied one or both of across the array and along the length of the light guide 110.

According to various embodiments and by definition, a microstructured multibeam element 120 of the microstructured multibeam element plurality comprises a microstructure. In some embodiments, the microstructured multibeam element 120 may comprise a single microstructure, while in other embodiments the microstructured multibeam element 120 may comprise a plurality of microstructures. The microstructured multibeam element 120 having one or more microstructures is configured to receive a portion of the guided light 104. In particular, a portion of the guided light 104 may be extracted or coupled out at an optical connection between the microstructured multibeam element 120 and the light guide 110. A portion of the microstructured multibeam element 120 at the optical connection may be referred to as input or input aperture of the microstructured multibeam element 120. The extracted or coupled-out portion of the guided light 104 is thus received by the microstructured multibeam element 120 at or through the input or input aperture. In turn, the plurality of directional light beams 102 is provided at an output or output aperture of the microstructured multibeam element 120.

According to various embodiments, the directional light beam plurality is provided from the received guided light portion by reflecting the received portion of the guided light 104 at or from an interior surface of the microstructured multibeam element 120 or more precisely an interior surface of the microstructure of the microstructured multibeam element 120. FIGS. 2A and 2C illustrate the directional light beams 102 as a plurality of diverging arrows depicted as being directed way from the first (or front) surface 110' of the light guide 110. Further, the directional light beams 102 are illustrated as being emitted from the microstructured multibeam element 120 at the output aperture thereof.

According to various embodiments, a size of the microstructured multibeam element 120 may be comparable to a size of a sub-pixel 106' in a multiview pixel 106 of a multiview display, according to various embodiments. This configuration may provide an optimal or near optimal beam width or beam overlap of various directional light beams 102 used in or by the multiview display. The multiview pixels 106 are illustrated in FIGS. 2A-2C with the multiview backlight 100 for the purpose of facilitating discussion.

Herein, the 'size' may be defined in any of a variety of manners to include, but not be limited to, a length, a width or an area. For example, the size of a sub-pixel 106' may be a length thereof and the comparable size of the microstructured multibeam element 120 may also be a length of the microstructured multibeam element 120 (such as a length of the output aperture of the microstructured multibeam element 120 or an aggregate length of a plurality of microstructures in the microstructured multibeam element 120 that corresponds to the output aperture thereof). In another example, size may refer to an area such that an area of the microstructured multibeam element 120 (such as an area of the output aperture of the microstructured multibeam element 120 or an aggregate area of a plurality of microstructures in the microstructured multibeam element 120) may be comparable to an area of the sub-pixel 106'.

In some embodiments, the size of the microstructured multibeam element 120 is comparable to the sub-pixel size such that the microstructured multibeam element size is between about fifty percent (50%) and about two hundred percent (200%) of the sub-pixel size. For example, if the microstructured multibeam element size (or equivalently output aperture size) is denoted 's' and the sub-pixel size is denoted 'S' (e.g., as illustrated in FIG. 2A), then the microstructured multibeam element size s may be given by equation (1) as $$S \leq s \leq 2S \qquad (1)$$

In other examples, the microstructured multibeam element size is greater than about sixty percent (60%) of the sub-pixel size, or about seventy percent (70%) of the sub-pixel size, or greater than about eighty percent (80%) of the sub-pixel size, or greater than about ninety percent (90%) of the sub-pixel size, and the microstructured multibeam element 120 is less than about one hundred eighty percent (180%) of the sub-pixel size, or less than about one hundred sixty percent (160%) of the sub-pixel size, or less than about one hundred forty percent (140%) of the sub-pixel size, or less than about one hundred twenty percent (120%) of the sub-pixel size. For example, by 'comparable size', the microstructured multibeam element size may be between about seventy-five percent (75%) and about one hundred fifty percent (150%) of the sub-pixel size. In another example, the microstructured multibeam element 120 may be comparable in size to the sub-pixel 106' where the microstructured multibeam element size is between about one hundred twenty-five percent (125%) and about eighty-five percent (85%) of the sub-pixel size. According to some embodiments, the comparable sizes of the microstructured multibeam element 120 and the sub-pixel 106' may be chosen to reduce, or in some examples to minimize, dark zones between views of the multiview display, while at the same time reducing, or in some examples minimizing, an overlap between views of the multiview display.

FIGS. 2A-2C further illustrate an array of light valves 108 configured to modulate the directional light beams 102 of the directional light beam plurality. The light valve array may be part of a multiview display that employs the multiview backlight 100, for example, and is illustrated in FIGS. 2A-2C along with the multiview backlight 100 for the purpose of facilitating discussion herein. In FIG. 2C, the array of light valves 108 is partially cut-away to allow visualization of the light guide 110 and the microstructured multibeam element 120 underlying the light valve array.

As illustrated in FIGS. 2A-2C, different ones of the directional light beams 102 having different principal angular directions pass through and may be modulated by different ones of the light valves 108 in the light valve array. Further, as illustrated, a light valve 108 of the array corresponds to a sub-pixel 106', and a set of the light valves 108 corresponds to a multiview pixel 106 of a multiview display. In particular, a different set of light valves 108 of the light valve array is configured to receive and modulate the directional light beams 102 from different ones of the microstructured multibeam elements 120, i.e., there is one unique set of light valves 108 for each microstructured multibeam element 120, as illustrated. In various embodiments, different types of light valves may be employed as the light valves 108 of the light valve array including, but not limited to, one or more of liquid crystal light valves, electrophoretic light valves, and light valves based on electrowetting.

As illustrated in FIG. 2A, a first light valve set 108a is configured to receive and modulate the directional light beams 102 from a first microstructured multibeam element 120a, while a second light valve set 108b is configured to receive and modulate the directional light beams 102 from a second microstructured multibeam element 120b. Thus, each of the light valve sets (e.g., the first and second light valve sets 108a, 108b) in the light valve array corresponds, respectively, to a different multiview pixel 106. Further, individual light valves 108 of the light valve sets correspond to the sub-pixels 106' of the respective multiview pixels 106, as illustrated in FIG. 2A.

Note that, as illustrated in FIG. 2A, the size of a sub-pixel 106' corresponds to a size (e.g., width) of a light valve 108 in the light valve array. In other examples, the sub-pixel size may be defined as a distance (e.g., a center-to-center distance) between adjacent light valves 108 of the light valve array. For example, the light valves 108 may be smaller than the center-to-center distance between the light valves 108 in the light valve array. The sub-pixel size may be defined as either the size of the light valve 108 or a size corresponding to the center-to-center distance between the light valves 108, for example.

In some embodiments, a relationship between the microstructured multibeam elements 120 of the plurality and corresponding multiview pixels 106 (e.g., sets of light valves 108) may be a one-to-one relationship. That is, there may be an equal number of multiview pixels 106 and microstructured multibeam elements 120. FIG. 2B explicitly illustrates by way of example the one-to-one relationship where each multiview pixel 106 comprising a different set of light valves 108 is illustrated as surrounded by a dashed line. In other embodiments (not illustrated), the number of multiview pixels 106 and microstructured multibeam elements 120 may differ from one another.

In some embodiments, an inter-element distance (e.g., center-to-center distance) between a pair of adjacent microstructured multibeam elements 120 of the plurality may be equal to an inter-pixel distance (e.g., a center-to-center distance) between a corresponding adjacent pair of multiview pixels 106, e.g., represented by light valve sets. For example, as illustrated in FIG. 2A, a center-to-center distance d between the first microstructured multibeam element 120a and the second microstructured multibeam element 120b is substantially equal to a center-to-center distance D between the first light valve set 108a and the second light valve set 108b. In other embodiments (not illustrated), the relative center-to-center distances of pairs of microstructured multibeam elements 120 and corresponding light valve sets may differ, e.g., the microstructured multibeam elements 120 may have an inter-element spacing (i.e., center-to-center distance d) that is one of greater than or less than a spacing (i.e., center-to-center distance D) between light valve sets representing multiview pixels 106.

Further (e.g., as illustrated in FIG. 2A), each microstructured multibeam element 120 is configured to provide directional light beams 102 to one and only one multiview pixel 106, according to some embodiments. In particular, for a given one of the microstructured multibeam elements 120, the directional light beams 102 having a principal angular direction in a view of the multiview display are substantially confined to a single corresponding multiview pixel 106 and the sub-pixels 106' thereof, i.e., a single set of light valves 108 corresponding to the microstructured multibeam element 120, as illustrated in FIG. 2A. As such, each microstructured multibeam element 120 of the multiview backlight 100 may provide a corresponding set of directional light beams 102 that has a principal angular direction in one of the different views of the multiview display (i.e., the set of directional light beams 102 contains light beams having a common direction in one of the different view directions).

According to various embodiments and by definition herein, the microstructured multibeam element 120 is located external to the light guide 110. However, while external to the light guide 110, the microstructured multibeam element 120 is optically coupled to or otherwise in in optical communication with the guided light 104 propagating within the light guide 110 as has already been mentioned. For example, the microstructured multibeam element 120 may be adjacent to and in contact with a surface of the light guide 110 at the input aperture of the microstructured multibeam element 120. The contact with the surface may facilitate optical coupling or optical communication of a portion of the guided light 104 into the microstructured multibeam element 120 through the input aperture thereof, for example.

In some embodiments, (e.g., as illustrated in FIGS. 2A-2C), the microstructured multibeam element 120 is adjacent to the first, front or top surface 110' of the light guide 110. The microstructured multibeam element 120 may comprise a hemispherical, pyramidal or similar shaped microstructure having a point contact at the first surface 110' of the light guide 110, for example. As such, the input aperture may comprise the point contact. Note that other input aperture configurations are possible besides a point contact including an embodiment illustrated in FIG. 4 and described below in which the input aperture and the output aperture are substantially coincident.

Further, according to various embodiments, the microstructure of the microstructured multibeam element 120 may comprise an optical transparent or substantially transparent dielectric material having a refractive index configured to enable coupling of the guided light portion from the light guide 110 into the microstructured multibeam element 120 as the received guided light portion. As such, the microstructured multibeam element 120 may comprise any of a variety of dielectric materials including, but not limited to, a material of the light guide 110 itself. For example, a material of the light guide 110 may be contiguous or continuous with a material of the microstructure of the microstructured multibeam element 120 at or across the light guide surface (e.g., at the first surface 110').

Alternatively, the microstructured multibeam element 120 may be otherwise optically coupled to the light guide surface at locations along the length of the light guide 110. For example, evanescent coupling through an optically thin layer may provide optical coupling between microstructure of the microstructured multibeam element 120 and light guide 110. The thin layer may comprise an optical adhesive or glue, for example. Note that at the point contact (e.g., as illustrated in FIG. 2A) or more generally at the input aperture (e.g., if the input aperture is other than a point contact), total internal reflection of the guided light 104 within the light guide 110 may be defeated allowing the guided light portion to 'leak' or be optically coupled into the microstructure of the microstructured multibeam element 120, according to various embodiments.

In some embodiments of the multiview backlight 100, the microstructured multibeam elements 120 of the microstructured multibeam element plurality may be located at or adjacent to the first surface 110' of the light guide 110 as substantially free-standing microstructures. For example, the microstructured multibeam elements 120 may be free-standing microstructures that are affixed (e.g., using an adhesive or by material bonding or welding) to the first surface 110' of the light guide 110, as illustrated in FIG. 2A. In other embodiments, the microstructured multibeam elements 120 adjacent to the first surface 110' may be supported by a carrier or carrier layer. In these embodiments, multiview backlight 100 may further comprises the carrier. In yet other embodiments, the carrier may be employed and thus present only during fabrication of the multiview backlight 100, after which it is removed. Thus, the microstructured multibeam elements 120 may be released from the carrier during a fabrication process, for example.

Figure 3A:
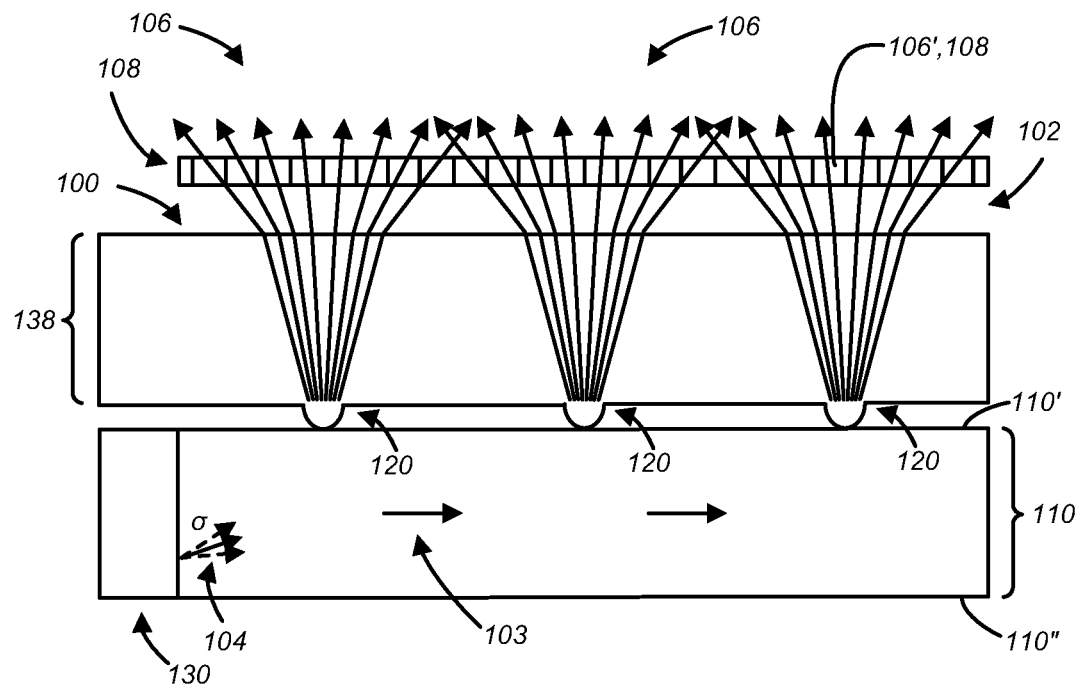
FIG. 3A illustrates a cross sectional view of a multiview backlight in an example, according to an embodiment consistent with the principles described herein.

FIG. 3A illustrates a cross sectional view of a multiview backlight 100 in an example, according to an embodiment consistent with the principles described herein. In particular, the multiview backlight 100 illustrated in FIG. 3A comprises the light guide 110 configured to guide the guided light 104 in a propagation direction 103. Further illustrated in FIG. 3A are a plurality of microstructured multibeam elements 120 external to but in contact with the light guide 110 at the first surface 110' of opposite a second surface 110'' thereof. As illustrated by way of example and not limitation, the microstructured multibeam elements 120 have a hemispherical shape with the input aperture of the microstructured multibeam elements 120 comprising a contact point between a bottom portion of the hemispherical shape and the light guide 110 at the first surface 110'. Also illustrated in FIG. 3A, for completeness, are light valves 108 of the light valve array including multiview pixels 106 comprising sub-pixels 106' configured to modulate directional light beams 102 of the directional light beam plurality.

The multiview backlight 100 illustrated in FIG. 3A further comprises a carrier 138. The carrier 138 is configured to carry and support the microstructured multibeam elements 120. For example, the microstructured multibeam elements 120 may be provided on a surface of the carrier 138 adjacent to the first surface 110' of the light guide 110. In some embodiments, the carrier 138 may comprise a light guide (e.g., a plate light guide) or similar transparent substrate or slab of material. For example, the carrier 138 may comprise a light guide that is substantially similar to the light guide 110. In some embodiments (e.g., as illustrated), the microstructured multibeam elements 120 may comprise a material of the carrier 138. For example, the microstructured multibeam elements 120 may be formed in or from a surface material of the carrier 138, e.g. as illustrated in FIG. 3A. In other embodiments, microstructured multibeam elements 120 may be affixed to the carrier surface as opposed to being formed in or from the surface material, e.g., using an adhesive.

Figure 3B:
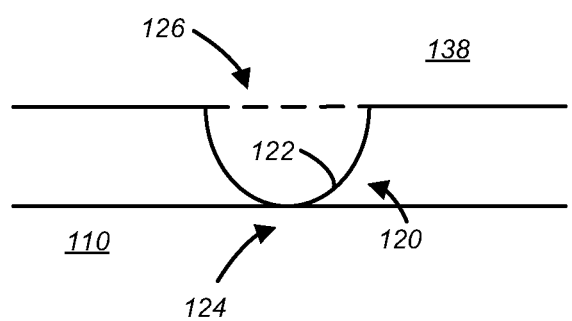
FIG. 3B illustrates a cross sectional view of a microstructured multibeam element of the multiview backlight illustrated in FIG. 3A, according to an embodiment consistent with the principles described herein.

FIG. 3B illustrates a cross sectional view of a microstructured multibeam element 120 of the multiview backlight 100 illustrated in FIG. 3A, according to an embodiment consistent with the principles described herein. The microstructured multibeam element 120 illustrated in FIG. 3B may be one of the microstructured multibeam elements 120 illustrated in FIG. 3A, for example. As illustrated, the microstructured multibeam element 120 includes an interior surface 122 configured to reflect light, an input aperture 124, and an output aperture 126. The interior surface 122 of the microstructured multibeam element 120 illustrated in FIG. 3B is equivalent to an interior surface of a microstructure of the microstructured multibeam element 120, as illustrated.

In FIG. 3B, the input aperture 124 is a direct contact between the microstructured multibeam element 120 and the light guide 110, e.g., as is also illustrated in FIG. 3A. Further, as described above, the input aperture 124 is configured to receive the guided light portion, while the output aperture 126 is configured to emit light as the plurality of directional light beams 102 by way of reflection of the received light from the interior surface 122. Reflection of the received guided light portion by the interior surface 122 may be provided by total internal reflection within the microstructure of the microstructured multibeam element 120, for example. In some embodiments, a portion of an exterior surface of the microstructured multibeam element 120 (i.e., a portion not including the input aperture 124) may be coated with a reflective material (e.g., a reflective metal) or provided with a reflective layer adjacent to the exterior surface, the reflective material or layer being configured to further facilitate reflection of the received guided light portion by the interior surface 122.

Figure 4:
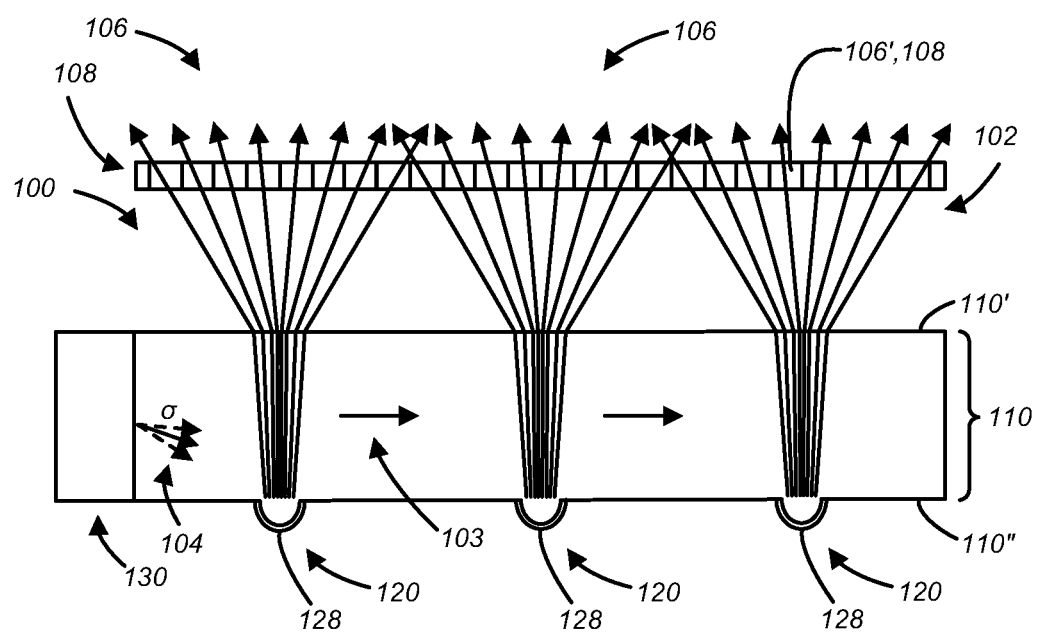
FIG. 4 illustrates a cross sectional view of a multiview backlight in an example, according to another embodiment consistent with the principles described herein.

FIG. 4 illustrates a cross sectional view of a multiview backlight 100 in an example, according to another embodiment consistent with the principles described herein. As illustrated in FIG. 4, the light guide 110 is configured to guide the guided light 104 in the propagation direction 103 along a length of the light guide 110, e.g., as was described above and also illustrated in FIGS. 2A and 3A. Also illustrated is the plurality of microstructured multibeam elements 120 external to the light guide 110. In particular, in FIG. 4 the microstructured multibeam elements 120 are illustrated as protruding from the second surface 110'' the light guide 110. In this embodiment, the microstructured multibeam elements 120 are configured to couple out the portion of the guided light 104 at an interface between the microstructured multibeam elements 120 and the light guide 110. The interface may be considered the input aperture of the microstructured multibeam element 120 illustrated in FIG. 4. Thus, the guided light 104 may remain inside the light guide 110 until it encounters and enters one of the plurality of microstructured multibeam elements 120 as the received guided light portion.

Further in FIG. 4, the microstructured multibeam elements 120 are configured to provide the plurality of directional light beams 102 having different principal angular directions at the output aperture. In this embodiment, the input aperture and the output aperture of the microstructured multibeam element 120 may be substantially coincident. FIG. 4 further illustrates a reflective layer 128 adjacent to the exterior of the microstructured multibeam elements 120 that is configured to reflect the received guided light portion.

As shown in FIG. 4, a material of the light guide 110 may be contiguous or continuous with a material of the microstructure of the microstructured multibeam elements 120 at the interface on the second surface 110". In other embodiments, the microstructure of the microstructured multibeam element 120 may comprise another material or may be physically separated from but optically coupled to the second surface 110" of the light guide 110. For example, the microstructures of the various microstructured multibeam elements 120 may be affixed to the second surface 110" using an optically transparent adhesive or similar layer.

Referring again to FIG. 2A, the multiview backlight 100 may further comprise a light source 130. According to various embodiments, the light source 130 is configured to provide the light to be guided within light guide 110. In particular, the light source 130 may be located adjacent to an entrance surface or end (input end) of the light guide 110. In various embodiments, the light source 130 may comprise substantially any source of light (e.g., optical emitter) including, but not limited to, one or more light emitting diodes (LEDs) or a laser (e.g., laser diode). In some embodiments, the light source 130 may comprise an optical emitter configured produce a substantially monochromatic light having a narrowband spectrum denoted by a particular color. In particular, the color of the monochromatic light may be a primary color of a particular color space or color model (e.g., an RGB color model). In other examples, the light source 130 may be a substantially broadband light source configured to provide substantially broadband or polychromatic light. For example, the light source 130 may be configured to provide white light. In some embodiments, the light source 130 may comprise a plurality of different optical emitters configured to provide different colors of light. The different optical emitters may be configured to provide light having different, color-specific, non-zero propagation angles of the guided light corresponding to each of the different colors of light.

In some embodiments, the light source 130 may further comprise a collimator. The collimator may be configured to facilitate efficient coupling of light into light guide 110, for example. The collimator is configured to receive substantially uncollimated light from one or more of the optical emitters of the light source 130. The collimator is further configured to convert the substantially uncollimated light into collimated light. In particular, the collimator may provide collimated light having the non-zero propagation angle and being collimated according to a predetermined collimation factor σ, according to some embodiments. The collimator is further configured to communicate the collimated light beam to the light guide 110 to propagate as the guided light 104, described above. However, the microstructured multibeam elements 120 do not require the use of collimated light. Therefore, in some embodiments substantially uncollimated light is provided by the light source 130.

According to various embodiments, the microstructure of the microstructured multibeam element 120 may have any of a variety of shapes. In particular, while microstructured multibeam elements 120 (or equivalently the microstructure thereof) are illustrated in FIGS. 3A, 3B and 4 having a hemispherical or half spherical shape, various other shapes or configurations may be used. For example, shapes of the microstructure of the microstructured multibeam elements 120 may include, but not limited to, a pyramidal shape, an elongated or 'stretched' pyramidal shape having principal axes of different lengths, and a 'leaf,' 'petal,' or boat shape with principal axes of either similar or different lengths. In some embodiments, the microstructure may be asymmetrical with a shape configured to one or both of split the plurality of directional light beams 102 into two or more differently directed groups and provide a substantially asymmetrical emission pattern to the plurality of directional light beams 102.

Figure 5A:
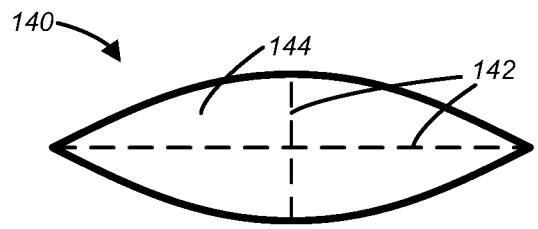
FIG. 5A illustrates a plan view of a microstructure of a microstructured multibeam element in an example, according to an embodiment consistent with the principles described herein.
Figure 5B:
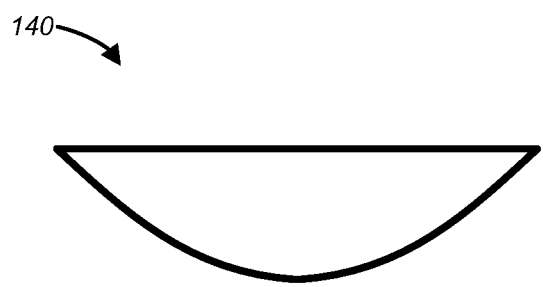
FIG. 5B illustrates a side view of the microstructure of FIG. 5A, according to an embodiment consistent with the principles described herein.
Figure 5C:
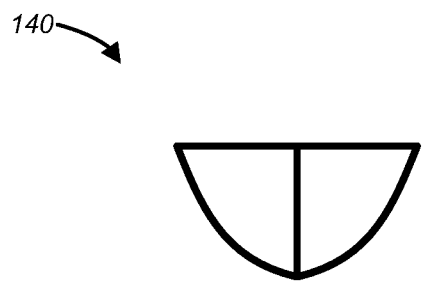
FIG. 5C illustrates an end view of the microstructure of FIG. 5A, according to an embodiment consistent with the principles described herein.

FIG. 5A illustrates a plan view of a microstructure 140 of a microstructured multibeam element 120 in an example, according to an embodiment consistent with the principles described herein. FIG. 5B illustrates a side view of the microstructure 140 of FIG. 5A, according to an embodiment consistent with the principles described herein. FIG. 5C illustrates an end view of the microstructure 140 of FIG. 5A, according to an embodiment consistent with the principles described herein. In particular, the microstructure 140 illustrated in FIGS. 5A-5C has a leaf shape. Further, as illustrated in FIG. 5A, principle axes 142 of the leaf-shaped microstructure 140 have different lengths. Also illustrated is an interior surface 144 of the leaf-shaped microstructure 140, which is equivalent to the interior surface 122 of the microstructured multibeam element 120, described above.

Figure 6A:
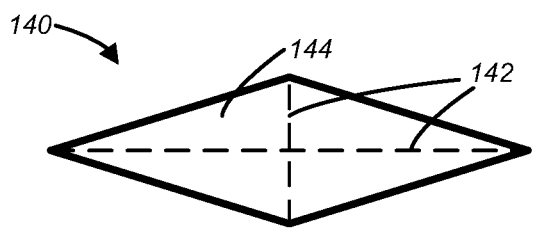
FIG. 6A illustrates a plan view of a microstructure of a microstructured multibeam element in an example, according to another embodiment consistent with the principles described herein.
Figure 6B:
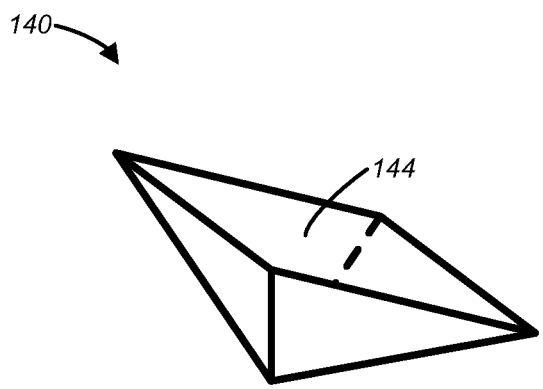
FIG. 6B illustrates a perspective view of the microstructure of FIG. 6A, according to an embodiment consistent with the principles described herein.

FIG. 6A illustrates a plan view of a microstructure 140 of a microstructured multibeam element 120 in an example, according to another embodiment consistent with the principles described herein. FIG. 6B illustrates a perspective view of the microstructure 140 of FIG. 6A, according to an embodiment consistent with the principles described herein. As illustrated in FIGS. 6A-6B, the microstructure 140 has a pyramidal shape. Further, principle axes 142 of the microstructure 140 are different in length yielding an elongated pyramidal shape, as illustrated in FIGS. 6A-6B. An interior surface 144 of the pyramidal-shaped microstructure 140 is also illustrated in FIG. 6B.

In addition to providing the plurality of directional light beams 102 from guided light portion received from the light guide 110, the microstructured multibeam elements 120 may also modify an emission pattern or angular distribution of the direction light beam plurality, according to some embodiments. For example, the microstructured multibeam elements 120 may at least partially collimate the directional light beams 102 of the directional light beam plurality, in some embodiments. Moreover, the partial collimation may be asymmetrical in at least two orthogonal directions. For example, leaf-shaped microstructures 140 of FIGS. 5A-5C when used as or in a microstructured multibeam element 120 may provide an emission pattern of the plurality of directional light beams 102 having or represented by an elliptical shape.

Figure 7A:
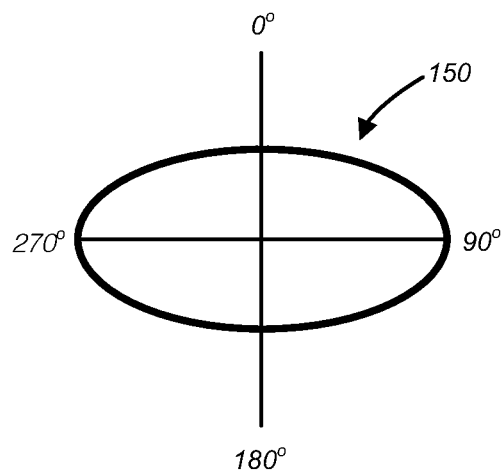
FIG. 7A illustrates a graphical representation of an elliptical-shaped emission pattern in an example, according to an embodiment consistent with the principles described herein.

FIG. 7A illustrates a graphical representation of an elliptical-shaped emission pattern 150 in an example, according to an embodiment consistent with the principles described herein. The illustrated elliptical-shaped emission pattern 150 may be provided by the leaf-shaped microstructure 140 of FIGS. 5A-5C, for example. In particular, a majority of the directional light beams 102 provided by a microstructured multibeam element 120 comprising a leaf-shaped microstructure (e.g., the microstructure 140 illustrated in FIGS. 5A-5C) may be within a particular angular spread defined by an ellipse, as illustrated by the elliptical-shaped emission pattern 150 FIG. 7A.

In another example, the microstructured multibeam elements 120 may perform beam splitting. In particular, a microstructure of the microstructured multibeam element 120 may be configured to provide a split emission pattern in which different subsets of the directional light beams (e.g., directional light beams 102, illustrated above) have different central angular directions from one another.

Figure 7B:
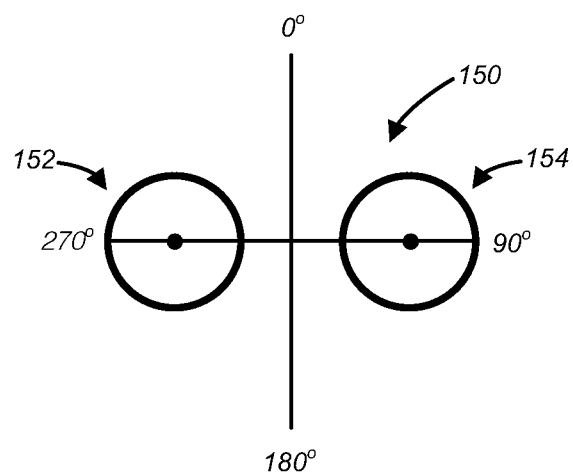
FIG. 7B illustrates a graphical representation of beam splitting by a microstructured multibeam element in an example, according to an embodiment consistent with the principles described herein.

FIG. 7B illustrates a graphical representation of beam splitting by a microstructured multibeam element 120 in an example, according to an embodiment consistent with the principles described herein. In particular, as illustrated a first subset of directional light beams 102 may be directed into a first portion 152 of the split emission pattern 150 and a second subset of the directional light beams 102 may be directed into a second portion 154 of the split emission pattern. An angular direction of a central axis of each of the subsets of directional light beams may define the central angular direction of the subset, for example. In some embodiments, the split emission pattern of FIG. 7B may be provided by a microstructure having a pyramidal shape, e.g., as illustrated in FIGS. 6A-6B.

As has been described above, the microstructured multibeam element 120 comprises one or more microstructures, by definition. Thus, the microstructured multibeam element 120 may be or comprise a single microstructure, in some embodiments. Various embodiments and examples described above and illustrated in FIG. 2A through FIG. 4 depict microstructured multibeam elements 120 having a single microstructure, by way of example and not limitation. In other embodiments, the microstructured multibeam element 120 may comprise a plurality of microstructures or equivalently an array of microstructures. As such, the plurality of microstructures, when considered as an aggregate, defines the microstructured multibeam element 120 including a size and an output aperture thereof. Moreover, except for a size of the microstructure being smaller than a size of the microstructured multibeam element, any of the microstructures and microstructure shapes described above may be employed in the plurality of microstructures, according to various embodiments.

In some of these embodiments, the plurality of microstructures of the microstructured multibeam elements 120 may be used to maintain brightness uniformity along distance from the light source. For example, brightness uniformity may be provided or maintained using a granular design or equivalently by varying a density of the microstructures along a length of the light guide to modulate scattering strength of the microstructured multibeam elements 120, e.g., as a function length.

Figure 8:
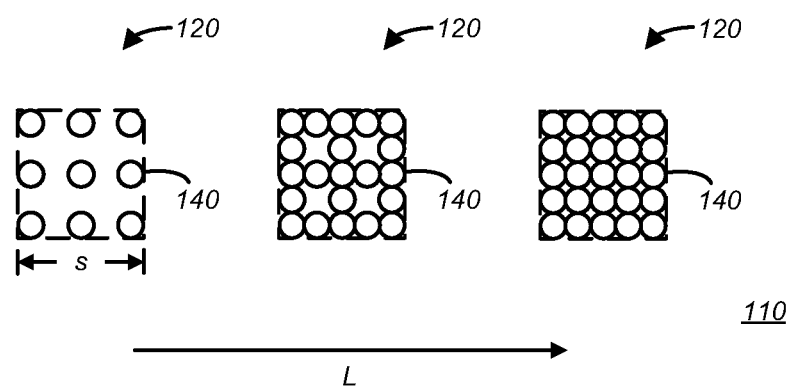
FIG. 8 illustrates a plan view of several microstructured multibeam elements in an example, according to an embodiment consistent with the principles described herein.

FIG. 8 illustrates a plan view of several microstructured multibeam elements 120 in an example, according to an embodiment consistent with the principles described herein. As illustrated in FIG. 8, each microstructured multibeam element 120 (outlined by a dashed line) comprises a plurality of microstructures 140 located on a light guide 110. Further, as illustrated, a density of the microstructures 140 varies (i.e., increases) as a function of the distance L along the light guide 110. The distance L may be a distance from a light source, for example. The increasing density may compensate for a general decrease in available guided light within the light guide 110 as a function of the distance L from the light source, for example. In addition, the shapes of the various microstructures 140 within and between the microstructured multibeam elements 120 may be varied as well as a shape thereof (not illustrated), according to some embodiments.

In accordance with some embodiments of the principles described herein, a multiview display is provided. The multiview display is configured to emit modulated directional light beams as pixels of the multiview display. Further, the emitted modulated directional light beams may be preferentially directed toward a plurality of viewing directions (i.e., as view pixels) of the multiview display. In some examples, the multiview display is configured to provide or 'display' a 3D or multiview image. Different ones of the modulated, differently directed light beams may correspond to individual view pixels in view directions of different 'views' associated with the multiview image, according to various examples. The different views may provide a 'glasses free' (e.g., autostereoscopic) representation of information in the multiview image being displayed by the multiview display, for example.

Figure 9:
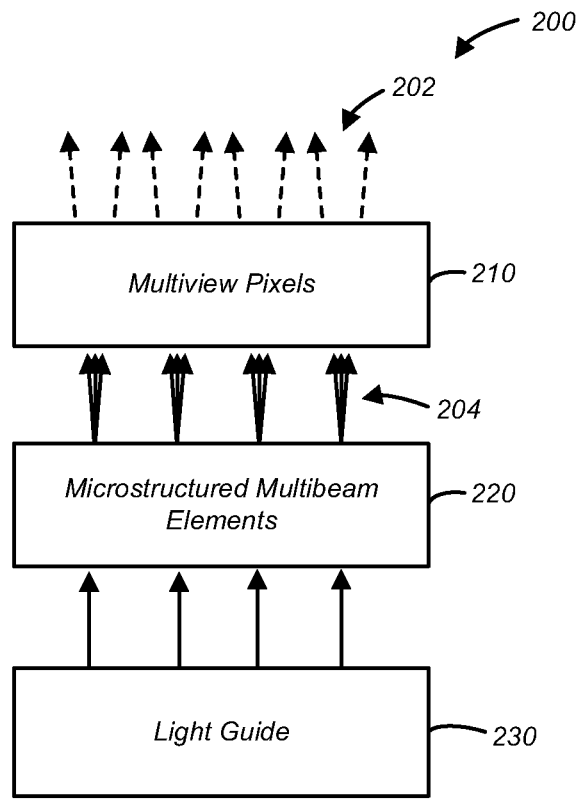
FIG. 9 illustrates a block diagram of a multiview display in an example, according to an embodiment consistent with the principles described herein.

FIG. 9 illustrates a block diagram of a multiview display 200 in an example, according to an embodiment consistent with the principles described herein. According to various embodiments, the multiview display 200 is configured to display a multiview image according to different views in different view directions. In particular, modulated directional light beams 202 emitted by the multiview display 200 are used to display the multiview image and may correspond to pixels of the different views (i.e., view pixels). The modulated directional light beams 202 are illustrated as arrows emanating from multiview pixels 210 in FIG. 9. Dashed lines are used for the arrows of the emitted, modulated directional light beams 202 to emphasize the modulation thereof by way of example and not limitation.

The multiview display 200 illustrated in FIG. 9 comprises an array of the multiview pixels 210. The multiview pixels 210 of the array are configured to provide a plurality of different views of the multiview display 200. According to various embodiments, a multiview pixel 210 of the array comprises a plurality of sub-pixels configured to modulate a plurality of directional light beams 204 and produce the emitted modulated directional light beams 202. In some embodiments, the multiview pixel 210 is substantially similar to a set of light valves 108 of the array of light valves 108, described above with respect to the multiview backlight 100. In particular, a sub-pixel of the multiview pixel 210 may be substantially similar to the above-described light valve 108. That is, a multiview pixel 210 of the multiview display 200 may comprises a set of light valves (e.g., a set of light valves 108), and a sub-pixel of the multiview pixel 210 may comprise a light valve (e.g., a single light valve 108) of the set.

According to various embodiments, the multiview display 200 illustrated in FIG. 9 further comprises an array of microstructured multibeam elements 220. Each microstructured multibeam element 220 of the array is configured to provide the plurality of directional light beams 204 to a corresponding multiview pixel 210. Directional light beams 204 of the plurality of directional light beams 204 have different principal angular directions from one another. In particular, the different principal angular directions of the directional light beams 204 correspond to different view directions of the different views of the multiview display 200.

According to various embodiments, a size of a microstructured multibeam element 220 of the microstructured multibeam element array is comparable to a size of a sub-pixel of the sub-pixel plurality. For example, the size of the microstructured multibeam element 220 may be greater than one half of the sub-pixel size and less than twice the sub-pixel size, in some embodiments. Further, an inter-element distance between microstructured multibeam elements 220 of the microstructured multibeam element array may correspond to an inter-pixel distance between multiview pixels 210 of the multiview pixel array, according to some embodiments. For example, the inter-element distance between the microstructured multibeam elements 220 may be substantially equal to the inter-pixel distance between the multiview pixels 210. In some examples, the inter-element distance between microstructured multibeam elements 220 and the corresponding inter-pixel distance between multiview pixels 210 may be defined as a center-to-center distance or an equivalent measure of spacing or distance.

Further, there may be a one-to-one correspondence between the multiview pixels 210 of the multiview pixel array and the microstructured multibeam elements 220 of the microstructured multibeam element array. In particular, in some embodiments, the inter-element distance (e.g., center-to-center) between the microstructured multibeam elements 220 may be substantially equal to the inter-pixel distance (e.g., center-to-center) between the multiview pixels 210. As such, each sub-pixel in the multiview pixel 210 may be configured to modulate a different one of the plurality of directional light beams 204 provided by a corresponding microstructured multibeam element 220. Further, each multiview pixel 210 may be configured to receive and modulate the directional light beams 204 from one and only one microstructured multibeam element 220, according to various embodiments.

In some embodiments, the microstructured multibeam element 220 of the microstructured multibeam element array may be substantially similar to the microstructured multibeam element 120 of the multiview backlight 100, described above. For example, the microstructured multibeam element 220 may comprise one or more microstructures.

The multiview display 200 further comprises a light guide 230 configured to guide light. The microstructured multibeam elements 220 of the element array are configured to couple out a portion of the guided light from the light guide 230 as the plurality of directional light beams 204 provided to the corresponding multiview pixels 210, according to these embodiments. In particular, the microstructured multibeam element 220 may be optically connected to the light guide 230 to couple out the portion of the guided light. In some embodiments, the light guide 230 of the multiview display 200 may be substantially similar to the light guide 110 described above with respect to the multiview backlight 100.

Further, in some of these embodiments (not illustrated in FIG. 9), the multiview display 200 may further comprise a light source. The light source may be configured to provide the light to the light guide 230. According to some embodiments, the light source may be substantially similar to the light source 130 of the multiview backlight 100, described above.

Figure 10:
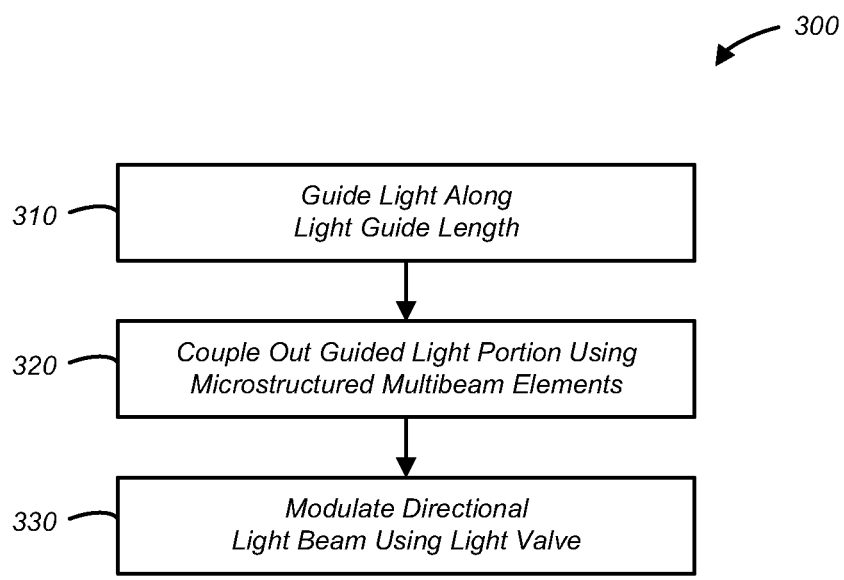
FIG. 10 illustrates a flow chart of a method of multiview display operation in an example, according to an embodiment consistent with the principles described herein.

In accordance with other embodiments of the principles described herein, a method of multiview display operation is provided. FIG. 10 illustrates a flow chart of a method 300 of multiview display operation in an example, according to an embodiment consistent with the principles described herein. As illustrated in FIG. 10, the method 300 of multiview display operation comprises guiding 310 light along a length of a light guide. Further, the guided light may be collimated according to a predetermined collimation factor. According to some embodiments, the light guide and the guided light may be substantially similar to the light guide 110 and the guided light 104, respectively, described above regarding the multiview backlight 100.

As illustrated in FIG. 10, the method 300 of multiview display operation further comprises coupling 320 a portion of the guided light out of the light guide using a plurality of microstructured multibeam elements located external to the light guide. In various embodiments, guided light portion is emitted by a microstructured multibeam element of the plurality of microstructured multibeam elements as a plurality of directional light beams having different principal angular directions from one another. Further, the different principal angular directions of the directional light beams of the directional light beam plurality correspond to view directions of different views of a multiview display.

In particular, a microstructured multibeam element receives the guided light portion at an input aperture of the microstructured multibeam element during coupling 320 out. Further, the microstructured multibeam element emits or provides the plurality of directional light beams at an output aperture by reflecting the received guided light portion from an interior surface of a microstructure of the microstructured multibeam element after which the light exits the microstructured multibeam element through an output aperture thereof as the directional light beam plurality. In some embodiments, the microstructured multibeam elements (and microstructures thereof) are substantially similar to the microstructured multibeam elements 120 of the multiview backlight 100, described above.

In some embodiments (not illustrated), the method 300 of multiview display operation further comprises providing light to the light guide using a light source. The provided light may be the guided light that is collimated within the light guide according to a collimation factor to provide a predetermined angular spread of the guided light within the light guide. In some embodiments, the light source may be substantially similar to the light source 130 of the multiview backlight 100, described above.

As illustrated in FIG. 10, the method 300 of multiview display operation further comprises modulating 330 directional light beams of the directional light beam plurality using light valves configured as a multiview pixel of the multiview display. According to some embodiments, a light valve of a plurality or array of light valves corresponds to a sub-pixel of the multiview pixels. That is, the microstructured multibeam element may have a size comparable to a size of the light valves or a center-to-center spacing between the light valves of the plurality for a group of one or more sub-pixels, for example. According to some embodiments, the plurality of light valves may be substantially similar to the array of light valves 108 described above with respect to FIGS. 2A-2C and the multiview backlight 100. In particular, different sets of light valves may correspond to different multiview pixels in a manner similar to the correspondence of the first and second light valve sets 108a, 108b to different multiview pixels 106, as described above. Further, individual light valves of the light valve array may correspond to a group of one or more sub-pixels of the multiview pixels as a light valve 108 corresponds to a sub-pixel 106' in the above-reference discussion of FIGS. 2A-2C.

Thus, there have been described examples and embodiments of a multiview backlight, a method of multiview display operation, and a multiview display that employ microstructured multibeam elements comprising one or more microstructures. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview backlight, comprising:
a light guide configured to guide light as guided light; and
a microstructured multibeam element adjacent and external to a surface of the light guide, the microstructured multibeam element having an input aperture configured to receive a portion of the guided light and an output aperture configured to emit a plurality of directional light beams having principal angular directions corresponding to view directions of a multiview display,
wherein the microstructured multibeam element comprises a microstructure having an interior surface configured to reflect the received guided light portion to provide the plurality of directional light beams at the output aperture, the microstructured multibeam element having a size to that is between one half and two times a size of a sub-pixel of a multiview pixel in a multiview display.

2. The multiview backlight of claim 1, wherein the microstructured multibeam element is adjacent to a first surface of the light guide, the first surface being adjacent to the multiview pixel, and wherein an input aperture of the microstructured multibeam element comprises a point of contact between the microstructure and the first surface.

3. The multiview backlight of claim 2, wherein the light guide is a first light guide, and further comprising a carrier configured to support the microstructured multibeam element adjacent to the first surface of the first light guide, wherein the carrier comprises a second light guide and the microstructured multibeam element is provided on a surface of the carrier adjacent to the first surface of the first light guide.

4. The multiview backlight of claim 3, wherein the microstructured multibeam element comprises a material of the carrier.

5. The multiview backlight of claim 1, wherein the microstructured multibeam element is adjacent and external to a second surface of the light guide, the second surface being opposite to a first surface of the light guide adjacent to the multiview pixel.

6. The multiview backlight of claim 5, wherein the microstructured multibeam element comprises a material of the light guide, the microstructured multibeam element protruding from the second surface of the light guide.

7. The multiview backlight of claim 1, further comprising a light source optically coupled to an input of the light guide or light sources optically coupled to inputs of the light guide, the light source or the light sources being configured to provide the guided light.

8. The multiview backlight of claim 1, wherein a shape of the microstructure of the microstructured multibeam element is one of a half spherical shape, a pyramidal shape and a leaf shape.

9. The multiview backlight of claim 1, wherein the microstructured multibeam element comprises a plurality of microstructures, a density of the microstructures being configured to modulate a scattering strength of the microstructured multibeam element to control brightness uniformity as a function of length along the light guide.

10. A multiview display comprising the multiview backlight of claim 1, the multiview display further comprising an array of light valves configured to modulate light beams of the plurality of light beams, a light valve of the array corresponding to a sub-pixel in the multiview pixel, a set of light valves of the array corresponding to the multiview pixel of the multiview display.

11. A multiview display comprising:
an array of multiview pixels configured to provide a plurality of different views of the multiview display, a multiview pixel comprising a plurality of light valves configured to modulate a plurality of directional light beams having different principal angular directions corresponding to view directions of the different views;
a light guide configured to guide light as guided light; and
an array of microstructured multibeam elements external to a surface of the light guide, a microstructured multibeam element of the array comprising a microstructure configured to receive a portion of the guided light and having an interior surface configured to reflect the received portion as the plurality of directional light beams,
wherein a microstructured multibeam element size is between one half and two times a size of a light valve.

12. The multiview display of claim 11, wherein the microstructured multibeam element is configured to provide the plurality of directional light beams at an output aperture of the microstructured multibeam element, the output aperture having a size between one half and two time a size of a light valve of the plurality of light valves.

13. The multiview display of claim 11, further comprising a carrier configured to support the array of microstructured multibeam elements adjacent to a first surface of the light guide, the first surface being adjacent to the array of multiview pixels, wherein microstructured multibeam elements of the array are located on a surface of the carrier adjacent to the first surface of the light guide.

14. The multiview display of claim 11, wherein the array of microstructured multibeam elements is adjacent and external to a second surface of the light guide, the second surface being opposite to a first surface of the light guide adjacent to the array of multiview pixels.

15. The multiview display of claim 14, wherein the microstructured multibeam element further comprises a reflective layer on an exterior surface of the microstructure, the reflective layer being configured to enhance reflection at the interior surface of the microstructure.

16. The multiview display of claim 11, further comprising a light source optically coupled to an input of the light guide, the light source being configured to provide light to the light guide as the guided light.

17. A method of multiview display operation, the method comprising:
guiding light as guided light along a length of a light guide;
coupling out a portion of the guided light from the light guide using a plurality of microstructured multibeam elements located external to and optically connected to the light guide, the guided light portion being emitted by a microstructured multibeam element of the plurality of microstructured multibeam elements as a plurality of directional light beams having different principal angular directions corresponding to view directions of different views of a multiview display; and modulating directional light beams of the plurality of directional light beams using a plurality of light valves configured as a multiview pixel of the multiview display, wherein the microstructured multibeam element comprises a microstructure that receives the guided light portion and having an interior surface that reflects the received guided light portion as the plurality of directional light beams.

18. The method of multiview display operation of claim 17, wherein the microstructured multibeam element has a size that is between one half and two times a size of a light valve of the plurality of light valves.

19. The method of multiview display operation of claim 17, wherein the plurality of microstructured multibeam elements are optically connected to the light guide at a surface of the light guide adjacent to the plurality of light valves, optically connected comprising a point contact between the microstructure of the microstructured multibeam element and the light guide surface.

* * * * *